(12) United States Patent
Wier

(10) Patent No.: US 12,197,966 B1
(45) Date of Patent: *Jan. 14, 2025

(54) SYSTEMS AND METHODS FOR MULTIUSER DATA CONCURRENCY AND DATA OBJECT ASSIGNMENT

(71) Applicant: Auctane, LLC, Austin, TX (US)

(72) Inventor: Byron J. Wier, Austin, TX (US)

(73) Assignee: Auctane, LLC, Austin, TX (US)

(*) Notice: Subject to any disclaimer, the term of this patent is extended or adjusted under 35 U.S.C. 154(b) by 215 days.

This patent is subject to a terminal disclaimer.

(21) Appl. No.: 17/401,767

(22) Filed: Aug. 13, 2021

Related U.S. Application Data

(63) Continuation of application No. 14/707,716, filed on May 8, 2015, now Pat. No. 11,157,331.

(60) Provisional application No. 62/082,393, filed on Nov. 20, 2014.

(51) Int. Cl.
  *G06F 9/52* (2006.01)
  *G06F 3/04842* (2022.01)
  *G06F 9/48* (2006.01)

(52) U.S. Cl.
  CPC .......... *G06F 9/526* (2013.01); *G06F 3/04842* (2013.01); *G06F 9/4881* (2013.01)

(58) Field of Classification Search
  None
  See application file for complete search history.

(56) References Cited

U.S. PATENT DOCUMENTS

| | | |
|---|---|---|
| 4,807,139 A | 2/1989 | Liechti |
| 4,812,994 A | 3/1989 | Taylor et al. |
| 5,010,485 A | 4/1991 | Bigari |
| 5,121,327 A | 6/1992 | Salazar |
| 5,822,739 A | 10/1998 | Kara |
| 6,381,590 B1 | 4/2002 | Debois |

(Continued)

FOREIGN PATENT DOCUMENTS

| | | | |
|---|---|---|---|
| EP | 1785856 A2 | 5/2007 | |
| WO | WO-0175643 A2 * | 10/2001 | ............. G06Q 30/06 |
| WO | WO-2004063943 A3 * | 9/2004 | ....... G06F 17/30345 |

OTHER PUBLICATIONS

Nicolae et al., Distributed Management of Massive Data: an Efficient Fine-Grain Data Access Scheme (Year: 2008).*

(Continued)

*Primary Examiner* — Mohamed N El-Bathy

(57) ABSTRACT

Systems and methods which facilitate management of functionality provided with respect to data objects in a multiuser environment are described. Embodiments are adapted to provide concurrency with respect to the data of the data objects in the multiuser environments, such as through the use of channel grouping techniques for providing various data communications. Additionally or alternatively, embodiments are adapted to implement data object assignments for facilitating management functionality available with respect to the multiuser environment, such as through the use of data object assignment containers created for storage of instances of assigned data objects. Through pre-creation of data object assignments to assignees, multiple users of a multiuser environment are enabled to utilize the functionality provided with respect to data objects without duplication of tasks and/or undesired conflicts between the users.

20 Claims, 4 Drawing Sheets

(56) References Cited

U.S. PATENT DOCUMENTS

| | | | |
|---|---|---|---|
| 6,385,731 B2 | 5/2002 | Ananda | |
| 6,424,954 B1 | 7/2002 | Leon | |
| 6,526,393 B1 | 2/2003 | Fredman | |
| 6,889,214 B1 | 5/2005 | Pagel et al. | |
| 7,149,726 B1 | 12/2006 | Lingle et al. | |
| 7,177,825 B1 | 2/2007 | Borders et al. | |
| 7,233,929 B1 | 6/2007 | Lingle et al. | |
| 7,243,842 B1 | 7/2007 | Leon et al. | |
| 7,383,194 B2 | 6/2008 | Heiden et al. | |
| 7,409,353 B1 | 8/2008 | Uslontsev et al. | |
| 7,430,424 B2 | 9/2008 | Kraft et al. | |
| 7,444,290 B2 | 10/2008 | Woods et al. | |
| 7,458,612 B1 | 12/2008 | Bennett | |
| 7,660,721 B2 | 2/2010 | Williams et al. | |
| 7,756,796 B2 | 7/2010 | Bodie et al. | |
| 7,765,168 B1 | 7/2010 | Dong et al. | |
| 7,827,118 B1 | 11/2010 | Smith, III et al. | |
| 7,882,042 B2 | 2/2011 | Meyer et al. | |
| 8,005,762 B2 | 8/2011 | Ogg et al. | |
| 8,255,337 B1 | 8/2012 | Bennett et al. | |
| 8,521,656 B2 | 8/2013 | Zimberoff et al. | |
| 8,600,913 B2 | 12/2013 | Williams et al. | |
| 8,738,542 B2 | 5/2014 | Malsbenden et al. | |
| 8,868,472 B1 | 10/2014 | Lin et al. | |
| 9,082,234 B1 | 7/2015 | Clem | |
| 9,230,233 B1 | 1/2016 | Sundaresan et al. | |
| 9,594,793 B2* | 3/2017 | Dantzig | G06F 16/2343 |
| 9,761,061 B1 | 9/2017 | Bussell et al. | |
| 9,823,909 B1 | 11/2017 | Kuo et al. | |
| 9,824,380 B1 | 11/2017 | Chowdhary et al. | |
| 9,842,308 B1 | 12/2017 | Biswas et al. | |
| 9,922,302 B2 | 3/2018 | Gventer et al. | |
| 11,315,066 B2 | 4/2022 | Deshpande et al. | |
| 2002/0161707 A1 | 10/2002 | Cole et al. | |
| 2003/0009425 A1 | 1/2003 | Stonedahl et al. | |
| 2003/0050819 A1 | 3/2003 | Koenigbauer et al. | |
| 2003/0088473 A1 | 5/2003 | Fisher et al. | |
| 2003/0089765 A1 | 5/2003 | Kovlakas | |
| 2003/0101147 A1 | 5/2003 | Montgomery et al. | |
| 2004/0044586 A1 | 3/2004 | Gullo et al. | |
| 2004/0083179 A1 | 4/2004 | Sesek et al. | |
| 2004/0212833 A1 | 10/2004 | Taskett et al. | |
| 2005/0060165 A1 | 3/2005 | Knight et al. | |
| 2006/0173799 A1 | 8/2006 | Minnocci | |
| 2006/0213979 A1 | 9/2006 | Geller et al. | |
| 2006/0213980 A1 | 9/2006 | Geller et al. | |
| 2006/0224462 A1 | 10/2006 | Brezenoff | |
| 2006/0229895 A1 | 10/2006 | Kodger | |
| 2007/0011187 A1 | 1/2007 | Chitgupakar et al. | |
| 2007/0073551 A1 | 3/2007 | Williams et al. | |
| 2007/0174213 A1 | 7/2007 | Whitehouse et al. | |
| 2007/0198977 A1* | 8/2007 | Abernethy | G06Q 10/10 718/100 |
| 2008/0004981 A1 | 1/2008 | Gopalpur et al. | |
| 2008/0103968 A1 | 5/2008 | Bies et al. | |
| 2008/0126404 A1* | 5/2008 | Slik | G06F 16/1774 |
| 2008/0133659 A1 | 6/2008 | Aldrey et al. | |
| 2008/0169343 A1 | 7/2008 | Skaaksrud et al. | |
| 2008/0306973 A1* | 12/2008 | Richard | G06F 16/254 |
| 2009/0146410 A1 | 6/2009 | Uslontsev et al. | |
| 2009/0172084 A1 | 7/2009 | Lavanya et al. | |
| 2009/0172126 A1 | 7/2009 | Brennan et al. | |
| 2009/0265585 A1 | 10/2009 | Ikegami | |
| 2009/0265634 A1* | 10/2009 | Beringer | G06F 8/38 709/204 |
| 2010/0076903 A1 | 3/2010 | Klingenberg et al. | |
| 2010/0179892 A1 | 7/2010 | O'Brien et al. | |
| 2010/0250549 A1 | 9/2010 | Muller et al. | |
| 2010/0323722 A1 | 12/2010 | Hatami | |
| 2011/0029429 A1 | 2/2011 | Whitehouse | |
| 2011/0133888 A1 | 6/2011 | Stevens et al. | |
| 2011/0173144 A1 | 7/2011 | Shan et al. | |
| 2011/0231334 A1 | 9/2011 | Jindel | |
| 2011/0317158 A1 | 12/2011 | Lyng et al. | |
| 2012/0054754 A1 | 3/2012 | Teichmann et al. | |
| 2012/0084090 A1 | 4/2012 | Woodard et al. | |
| 2012/0109777 A1 | 5/2012 | Lipsitz et al. | |
| 2012/0216133 A1 | 8/2012 | Barker et al. | |
| 2012/0265676 A1 | 10/2012 | Gould et al. | |
| 2013/0056533 A1 | 3/2013 | Zimberoff et al. | |
| 2013/0061337 A1 | 3/2013 | Zimberoff et al. | |
| 2013/0144763 A1 | 6/2013 | Skyberg et al. | |
| 2013/0179361 A1* | 7/2013 | Williams | G06Q 10/08345 705/330 |
| 2013/0318533 A1* | 11/2013 | Aghassipour | G06Q 10/063118 718/103 |
| 2013/0346249 A1 | 12/2013 | Li | |
| 2014/0149308 A1 | 5/2014 | Ming | |
| 2014/0208325 A1* | 7/2014 | Chen | G06F 9/4881 718/102 |
| 2014/0278099 A1 | 9/2014 | Schenken | |
| 2015/0046361 A1 | 2/2015 | Williams et al. | |
| 2015/0081360 A1* | 3/2015 | Sun | G06Q 10/06311 705/7.13 |
| 2016/0196527 A1 | 7/2016 | Bose et al. | |

OTHER PUBLICATIONS

Ferraiolo et al., On the unification of access control and data services (Year: 2014).*

Prakash et al., Data management issues and trade-offs in CSCW systems (Year: 1999).*

"E-Commerce Technology—The Most Modular and Scalable E-Commerce Platform that Grows With Your Business," http://www.newgistics.com/corp_ecommerce/index.aspx, last accessed May 13, 2015, undated, 6 pages.

"Endicia Releases Unique Return Shipping Solution," retrieved from http://www.endicia.com/about-us/press-room/20140610, last accessed May 13, 2015, Jun. 10, 2014, 2 pages.

"Newgistics: Offering Reverse Logistics to Easily Manage Returns," retrieved from http://www.newgistics.com/corp_returns/#newgisticssmartlabelandshipmentmanager, last accessed May 13, 2015, undated, 5 pages.

"Return Services & Options for Parcels," retrieved from https://www.usps.com/business/return-services.htm, last accessed May 13, 2015, undated, 6 pages.

"Return Shipping Labels—Simplify Product Returns Without the Extra Cost of Accounts & Permits," retrieved from http://www.endicia.com/Features/ReturnShippingLabels/, last accessed May 13, 2015, undated, 2 pages.

"Returns Made Easy," retrieved from <https://www.usps.com/returns/>, last accessed May 13, 2015, undated, 5 pages.

Grabara, J et al. "The Role of Information Systems in Transport Logistics" International Journal of Education and Research, vol. 2, No. 2, Feb. 2014, 8 pages.

International Search Report and Written Opinion issued for PCT Application No. PCT/US2017/020662, dated May 19, 2017, 14 pages.

Rosetti et al., An Object-Oriented Framework for Simulating Multi-Echelon Inventory Systems, 2006.

Unpublished U.S. Appl. No. 12/316,542 to Leon, filed Dec. 9, 2008 and entitled "Mail Piece Processing," 74 pages.

Unpublished U.S. Appl. No. 13/647,001 to Yoggi, filed Oct. 8, 2012 and entitled "Systems and Methods for Providing Shipping Service Guarantees," 44 pages.

Unpublished U.S. Appl. No. 13/705,935 to McBride, filed Dec. 5, 2012 and entitled "Visual Graphic Tracking of Item Shipment and Delivery," 62 pages.

Unpublished U.S. Appl. No. 13/828,800 to Atkinson, filed Mar. 14, 2013 and entitled "Systems and Methods for Mail Piece Interception, Rescue Tracking, and Confiscation Alerts and Related Services," 63 pages.

Weigand, H. et al. "Rule-based service composition and service-oriented business rule management." Proceedings of the International Workshop on Regulations Modelling and Deployment

(56) References Cited

OTHER PUBLICATIONS (ReMoD'08). Research Group: Information Management, Jun. 2008, 12 pages.

* cited by examiner

| ORDER ASSIGNMENT CONTAINER #100465 | | OWNER: SALLY | — 470 |
|---|---|---|---|
| ORDER ID | SEQUENCE | STATUS | |
| 12345 | 1 | UNPROCESSED | |
| 12346 | 2 | UNPROCESSED | |
| 12347 | 3 | UNPROCESSED | |
| 12348 | 4 | UNPROCESSED | |

*FIG. 4*

SYSTEMS AND METHODS FOR MULTIUSER DATA CONCURRENCY AND DATA OBJECT ASSIGNMENT

CROSS-REFERENCE TO RELATED APPLICATIONS

The present application is a continuation of U.S. patent application Ser. No. 14/707,716 filed May 8, 2015, and entitled "SYSTEMS AND METHODS FOR MULTIUSER DATA CONCURRENCY AND DATA OBJECT ASSIGNMENT," and related to, and hereby claims benefit of priority to, commonly assigned U.S. provisional patent application Ser. No. 62/082,393 entitled "SYSTEMS AND METHODS FOR CLOUD-BASED APPLICATION ACCESS TO RESOURCES," filed Nov. 20, 2014, the disclosures of which are incorporated by reference herein in their entirety.

TECHNICAL FIELD

The invention relates generally to management of data and data objects in a multiuser environment and, more particularly, to providing data concurrency and/or assignment of one or more data objects for facilitating management of functionality provided with respect to the data objects.

BACKGROUND OF THE INVENTION

The use of various forms of computing equipment to automate or otherwise perform a number of tasks has become widespread. With the proliferation of processor-based platforms, such as personal computers (PCs), tablet devices, smart phones, personal digital assistants (PDAs), and servers, capable of executing instruction sets for providing specialized or generalized functionality, such as word processing, accounting, document generation and management, printing, data communication, and image capture, generation, and management, the use of such computing equipment has become nearly ubiquitous in both business as well as personal settings. One example of functionality that is provided through the use of such computing equipment is the automation of tasks associated with the shipment of items, including the management of item orders, managing the picking and packing of items for order fulfilment, generation of invoices, packing slips, manifests, shipping labels, and postage or other prepaid shipping indicia, and tracking of shipment of items through a shipping service provider, as provided by the SHIPSTATION shipping management system provided by Auctane LLC of Austin Texas.

A number of different fundamental configurations have been implemented with respect to the system implementations for providing the various functionality. For example, localized deployment of one or more applications, wherein the application(s) providing the instructions for implementing various tasks is stored and executed by computing equipment local to the user (e.g., a user device, such as a PC, tablet device, smart phone, or PDA), may be utilized for providing desired functionality. Alternatively, cloud-based deployment of one or more applications, wherein the application(s) providing the instructions for implementing various tasks is stored and executed by computing equipment disposed in a network "cloud" (e.g., a group of servers remote from the user), may be utilized for providing desired functionality.

Such computing system configurations may be utilized to provide the desired functionality in a multiuser environment. For example, multiple personnel of a particular company may be enabled to access and manage data for the company. Continuing with the foregoing exemplary shipping management system functionality, a plurality of users associated with an online merchant may be enabled to interact with order data for the management of item orders, managing the picking and packing of items for order fulfilment, generation of invoices, packing slips, manifests, shipping labels, and postage or other prepaid shipping indicia, and tracking of shipment of items. Such multiuser scenarios, however, present issues with data concurrency and the potential for duplication of tasks.

Configurations implementing cloud-based deployment of applications have become quite popular in recent years, particularly for enabling a multiuser environment operable to provide desired functionality for a plurality of users. Such cloud application deployments provide advantages with respect to the deployment and maintenance of the applications. For example, the burden for obtaining and maintaining computing equipment (e.g., processor capability, memory capacity, etc.) sufficient to store and execute the application(s) is largely placed upon the cloud application provider. A user of the cloud application typically needs only a relatively modestly equipped client system (e.g., processor-based system executing a browser, such as INTERNET EXPLORER, GOOGLE CHROME, or FIREFOX, or thin client application) in order to interface with and implement functionality of the cloud application. Moreover, the user is relieved of the need to manage or monitor the lifecycle of the application(s). Instead, the cloud application provider generally installs and configures the application, maintains version control, obtains and installs updates and patches, coordinates resource interoperability maintenance, etc. Accordingly, the users are enabled to enjoy the various upgrades, enhancements, and patches to the applications as they are put online by the cloud application provider, without the user having to maintain or monitor the application lifecycle. Thus, users of such configurations implementing cloud-based deployment of applications are typically saved significant expenses in terms of monetary costs, time, and computing resources.

Nevertheless, such configurations implementing cloud-based deployment of applications have disadvantages associated therewith. For example, each user within the multiuser environment provided by the cloud-based deployment may be utilizing a browser based thin client, as described above, whereby instances of then current data are provided to and displayed by the thin client. These instances of data present at particular users' devices may become stale very quickly as other users in the multiuser environment interact with the system and cause data to be changed or updated, thereby resulting in data concurrency issues as between the multiple users. Although the users' clients may be utilized to periodically "refresh" the data by blindly re-requesting the data, such operation may be problematic in a multiuser environment (e.g., resulting in high levels of server accesses and consuming large amounts of communication bandwidth, even where new/altered data is not present).

Moreover, multiple users may utilize the data to perform the same or overlapping tasks simultaneously, without knowledge of another user also being in the process of performing the particular task. Continuing with the foregoing example of a shipping management system, multiple personnel, possibly present at different locations (e.g., geographically distributed warehouses), handling the shipping of orders may each access the data for a particular order to pick and package the items ordered therein for shipment, and even generate shipping labels (e.g., with prepaid postage indicia thereon) and possibly ship the order, without realizing that a co-worker is performing the same activity with respect to a particular order. In operation according to some existing embodiments of a cloud-based shipping management system, the users may be enabled to select certain orders, such as by selecting one or more such order and storing the data for the order in a personal work area (e.g., a personal "loading dock" database or queue), for their work in processing the orders. However, such personal work areas are local to the particular user for which they are created (e.g., residing only within the memory of the user device being accessed by the user), and thus provide no indication to other users within the multiuser environment that another user has undertaken performance of some task related to the order.

Although it may be possible for user's in some multiuser environments to cause a status flag or register to be changed, such as to indicate "in processes" or a similar designation, such status messages are informational only and do not avert multiple users from actually performing the task. For example, the status message, when utilized, is generally merely presented as one piece of information in a display of a large amount of information (e.g., an order processing screen displaying multiple columns of data for a large number of orders), whereby users may fail to notice the status message. Moreover, the above mentioned data concurrency issues may result in users not being provided such status information in a timely manner.

BRIEF SUMMARY OF THE INVENTION

The present invention is directed to systems and methods which facilitate management of functionality provided with respect to data objects in a multiuser environment. Embodiments of the invention are adapted to provide concurrency with respect to the data of the data objects in the multiuser environments for facilitating management of multiuser environment functionality. Additionally or alternatively, embodiments of the invention are adapted to implement data object assignments for facilitating management functionality available with respect to the multiuser environment.

In providing data concurrency according to embodiments of the invention, a channel grouping technique is used for providing various directives or notifications for managing and/or implementing functionality of a multiuser environment. For example, the multiuser environment may be provided using a cloud-based implementation in which communication is provided between cloud client applications operable upon user devices and a cloud-based application operable upon a cloud server. Such communication may be provided, for example, using inter-process communication flows anchored with network sockets at the respective cloud client applications and cloud-based application. In operation, the cloud client applications operable on the client devices may initiate and establish an open channel with the cloud-based application operable upon the cloud server, whereby messages can be sent from the cloud client application or the cloud-based application at any time. A plurality of the aforementioned channels may be bundled to provide a grouped channel, such as to facilitate interaction and functionality for a number of affiliated users (e.g., employees of a same company, members of a family, etc.). The communications provided via the various channels of the channel group may comprise various directives or notifications for implementing functionality of the cloud-based application by or on behalf of the affiliated users thereof. Moreover, the channel group may be utilized to provide data concurrency with respect to the cloud client applications of the group according to embodiments of the invention.

In providing data object assignments according to embodiments of the invention, various data object assignment containers may be created for storage of instances of assigned data objects. Such data object assignment containers preferably have a designated container assignee, whereby data objects associated with a data object assignment container are assigned to the designated container assignee. In operation according to embodiments, particular data objects may be selected and associated with a data object assignment container for performing of one or more tasks with respect to the selected data objects by a container assignee designated for the data object assignment container. Data objects which are associated with a data object assignment container for which one or more tasks remains to be performed or completed may only be associated with one such data object assignment container according to embodiments of the invention. Thus, although a data object may be removed from association with one data object assignment container for which one or more tasks remains to be performed and subsequently associated with another data object assignment container for which one or more tasks remains to be performed, the association of data objects with a data object assignment container assigns the data objects to a designated container assignee for performing the one or more tasks and prevents simultaneous assignment of the data object to another assignee for performing the one or more tasks. Through such pre-creation of data object assignments to assignees, the multiple users of a multiuser environment are enabled to utilize the functionality provided with respect to data objects in a multiuser environment without duplication of tasks and/or undesired conflicts between the users.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 shows an example of a data object assignment container according to concepts of the present invention.

DETAILED DESCRIPTION OF THE INVENTION

Figure 1:
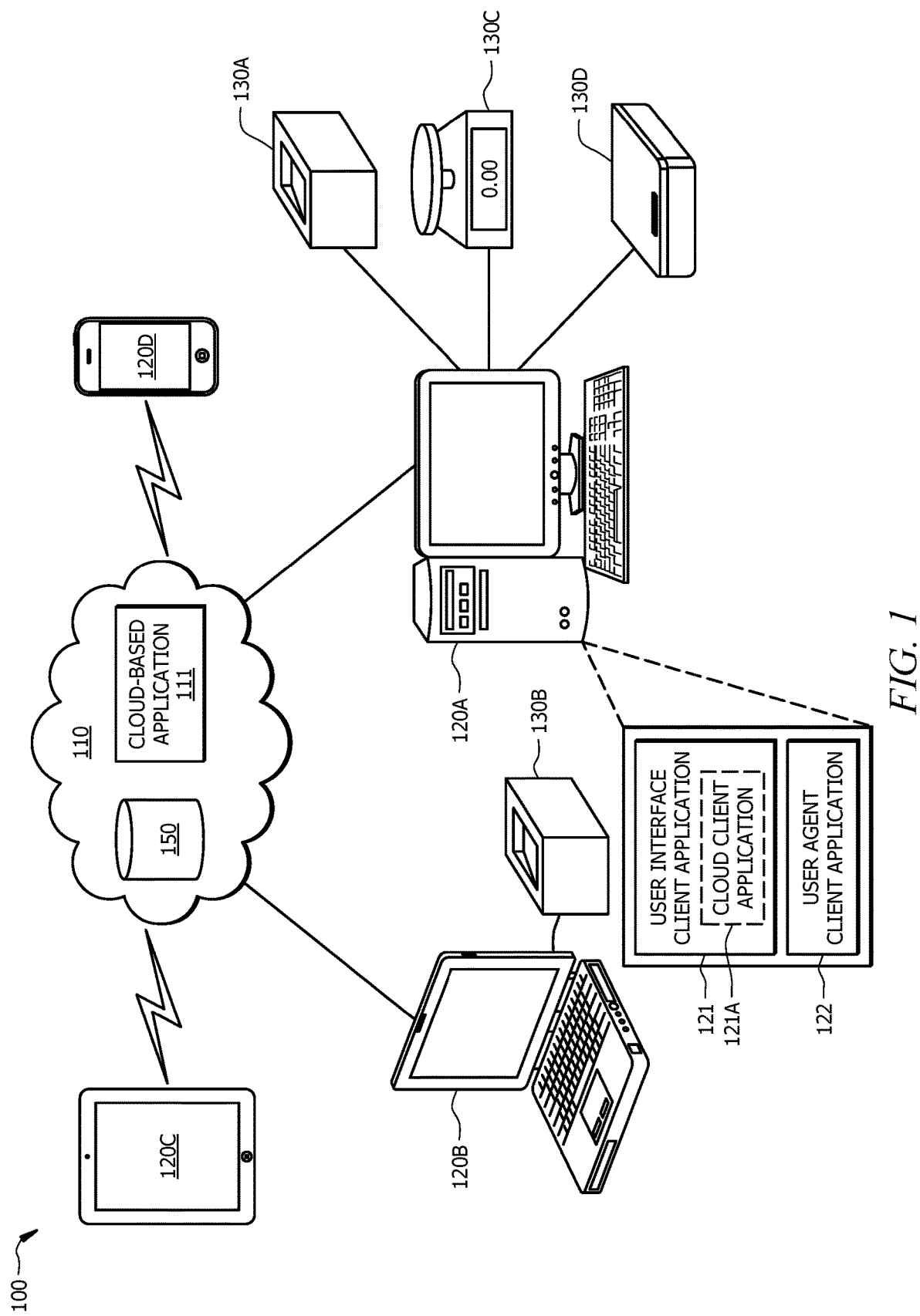
FIG. 1 shows a system adapted according to concepts of the present invention.

FIG. 1 shows an embodiment of cloud-based system 100 adapted to facilitate management of functionality provided with respect to data objects in a multiuser environment according to concepts of the present invention. System 100 of the illustrated embodiment includes network 110 in which cloud-based application 111 is present. It should be appreciated that although a single cloud-based application is shown for simplicity, embodiments of a cloud-based system may comprise any number of cloud-based applications, wherein such cloud-based applications may be similar and/or different with respect to any other cloud-based application. Similarly, it should be appreciated that the "cloud" environment associated with network 110 may comprise applications, systems, devices, etc. (e.g., storage 150) in addition to cloud-based application 111, one or more of which may be utilized by or otherwise operable with cloud-based application 111 for providing functionality as described herein.

Cloud-based application 111 comprises a cloud-based deployment of a multiuser application which is stored and executed by computing equipment disposed in the "cloud" of network 110. Accordingly, cloud-based application 111 may comprise computer executable code executing on one or more processor-based systems (e.g., web servers) deployed in network 110. Cloud-based application 111 may, for example, comprise a system providing various desired functionality such as in the form of software as a service (SaaS), infrastructure as a service (IaaS), platform as a service (PaaS), unified communications as a service (UCaaS), etc. As a specific example, cloud based application 111 may comprise a shipping management system operable to provide the automation of tasks associated with the shipment of items, including the management of item orders, managing the picking and packing of items for order fulfillment, generation of invoices, packing slips, manifests, shipping labels, and postage or other prepaid shipping indicia, and/or tracking of shipment of items through a shipping service provider. In accordance with embodiments of the invention, cloud-based application provides a multi-carrier shipping management system capable of providing various shipping functionality (e.g., rating, shipping indicia generation, packing list printing, shipping label printing, tracking, carrier pickup request, manifest printing, account management and payment, etc.) for a plurality of shipping service providers (e.g., the United States Postal Service (USPS), United Parcel Service (UPS), Federal Express, DHL, local couriers, etc.).

Network 110 of the illustrated embodiment provides communication links facilitating the communication between various systems and components of system 100, such as user devices 120A-120D and cloud-based application 111. Accordingly, network 110 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

Storage 150 shown in the illustrated embodiment disposed in the cloud environment of network 110 may comprise various forms of tangible, non-transitory computer readable media. For example, storage 150 of embodiments may comprise random access memory (RAM), read only memory (ROM), flash memory, disk memory, magnetic memory, optical memory, etc. Storage 150 may comprise a storage array or other storage system, such as a redundant array of independent disks (RAID) array, a storage area network (SAN), a network attached storage (NAS) array, and/or the like. Such computer readable storage may be utilized to store various information, including program code of cloud-based application 111, program code of cloud client application 121A, program code of user agent client application 122, data utilized by and/or with any or all of cloud-based application 111, cloud client application 121A, and user agent client application 122, etc.

User devices 120A-120D of embodiments comprise processor-based systems (e.g., a terminal in the form of one or more computer, workstation, kiosk terminal, portable processor-based device, etc.) operable under control of one or more instruction set (e.g., software, firmware, applet, etc.) adapted to cooperate with cloud-based application 111 to provide desired functionality, such as the aforementioned exemplary shipping management functionality. User devices 120A and 120B of the illustrated embodiment, for example, comprise computer systems having a processor, memory, and input/output to enable interaction with cloud-based application 111 for providing at least some portion of functionality available through operation of system 100. User device 120C of the illustrated embodiment, however, comprises a tablet device having a processor, memory, and input/output to enable interaction with cloud-based application 111 for providing at least some portion of functionality available through operation of system 100. User device 120D of the illustrated embodiment comprises a smart phone having a processor, memory, and input/output to enable interaction with cloud-based application 111 for providing at least some portion of functionality available through operation of system 100. The communication links between the user devices and the other nodes of system 100 (e.g., cloud-based application 111, computing resources 130A-130D, and other ones of user devices 120A-120D) may comprise wired links (e.g., as illustrated for user devices 120A and 120B) or wireless links (e.g., as illustrated for user devices 120C and 120D), as well as combinations thereof. It should be appreciated that, although the illustrated embodiment shows a representative example of the number and configuration of user devices as may be utilized with respect to system 100, the concepts of the present invention are not limited to application to the particular number or configuration of user devices shown.

From the foregoing it can be appreciated that user devices 120A-120D of embodiments comprise processor-based systems operating under control of one or more instruction set (e.g., software, firmware, applet, etc.) to provide operation as described herein. Such processor-based systems may comprise a central processing unit (CPU) (e.g., a processor from the PENTIUM or CORE line of processors available from Intel Corporation), memory (e.g., RAM, ROM, flash memory, disk memory, optical memory, etc., exemplary embodiments of which are represented as storage 150A and 150D in FIG. 2) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.).

Various peripherals and other computing resources useful in providing functionality available through operation of system 100 may be coupled to or otherwise in communication with user devices, or other nodes of system 100, of embodiments. For example, computing resources, such as one or more printer (e.g., thermal printer, ink printer, laser printer, etc.), imaging device (e.g., optical scanner, barcode scanner, handheld scanner, camera, biometric sample scanner, etc.), scale (e.g., electronic scale, digital scale), memory device (e.g., optical disk drive, hard disk drive, solid state disk drive, etc.), and/or the like, may be provided for use with any or all of the foregoing processor-based systems according to embodiments herein. Computing resources 130A and 130B, shown in the illustrated embodiment as printers (e.g., printer for printing proof of payment indicia, bills of lading, manifests, receipts, shipping labels, etc.) are shown as being coupled to user devices 120A and 120B, respectively. Similarly, computing resource 130C, shown as a scale (e.g., an electronic scale for weighing items for shipping), and computing resource 130D, shown as an imaging device (e.g., a scanner for obtaining images of shipping items, for scanning barcodes, for scanning addresses or other shipping item information, etc.), are shown as being coupled to user device 120A of the illustrated embodiment. Of course, configurations and deployments of computing resources different than that shown may be utilized according to embodiments of the invention.

User devices 120 (e.g., user devices 120A-120D) of system 100 of embodiments comprise one or more client applications for interacting with cloud-based application 111 to provide operation as described herein. For example, user devices 120 may comprise a user interface client application (e.g., user interface client application 121 shown with user device 120A) operable to facilitate user interaction with cloud-based application 111. Such user interface client applications may comprise a web browser (e.g., INTERNET EXPLORER, GOOGLE CHROME, or FIREFOX) hosting a cloud client application (e.g., cloud client application 121A shown with user interface client application 121) or applet associated with cloud-based application 111 and operable within the web browser. For example, a user may interact with cloud-based application 111 via a cloud client application executing within a user interface client application. Continuing with the above example of a shipping management system, the user may provide input to control cloud-based application 111 to perform functions such as managing item orders, managing the picking and packing of items for order fulfilment, generating invoices, packing slips, manifests, shipping labels, and/or postage indicia, and/or tracking shipment of items using a shipping management client application executing within a browser executing upon one or more user device 120.

User devices 120 of embodiments may comprise a user agent client application (e.g., user agent client application 122 shown with user device 120A) operable to facilitate access to computing resources (e.g., any or all of computing resources 130A-130D) by cloud-based application 111. In operation according to embodiments, user agent client application 122 comprises an application which is separate from user interface client application 121 and which is executed by user device 120 to implement localized access to one or more computing resources 130 (FIG. 2), as described in detail in the above referenced patent application entitled "SYSTEMS AND METHODS FOR CLOUD-BASED APPLICATION ACCESS TO RESOURCES." Utilizing such localized access to computing resource 130, user agent client application 122 may interact with cloud-based application 111 and/or cloud client application 121A-1 and/or 121A-2 (FIG. 2) to enable the cloud-based application to output to and/or obtain input from one or more of the computing resource. Accordingly, embodiments of the invention provide a localized application in the form of user agent client application 122 that has direct or localized access to computing resources, to directly communicate with and control the operation of those resources, whereby through cooperation of the localized application and cloud-based application the cloud-based application is enabled to access and utilize the computing resources.

Figure 2:
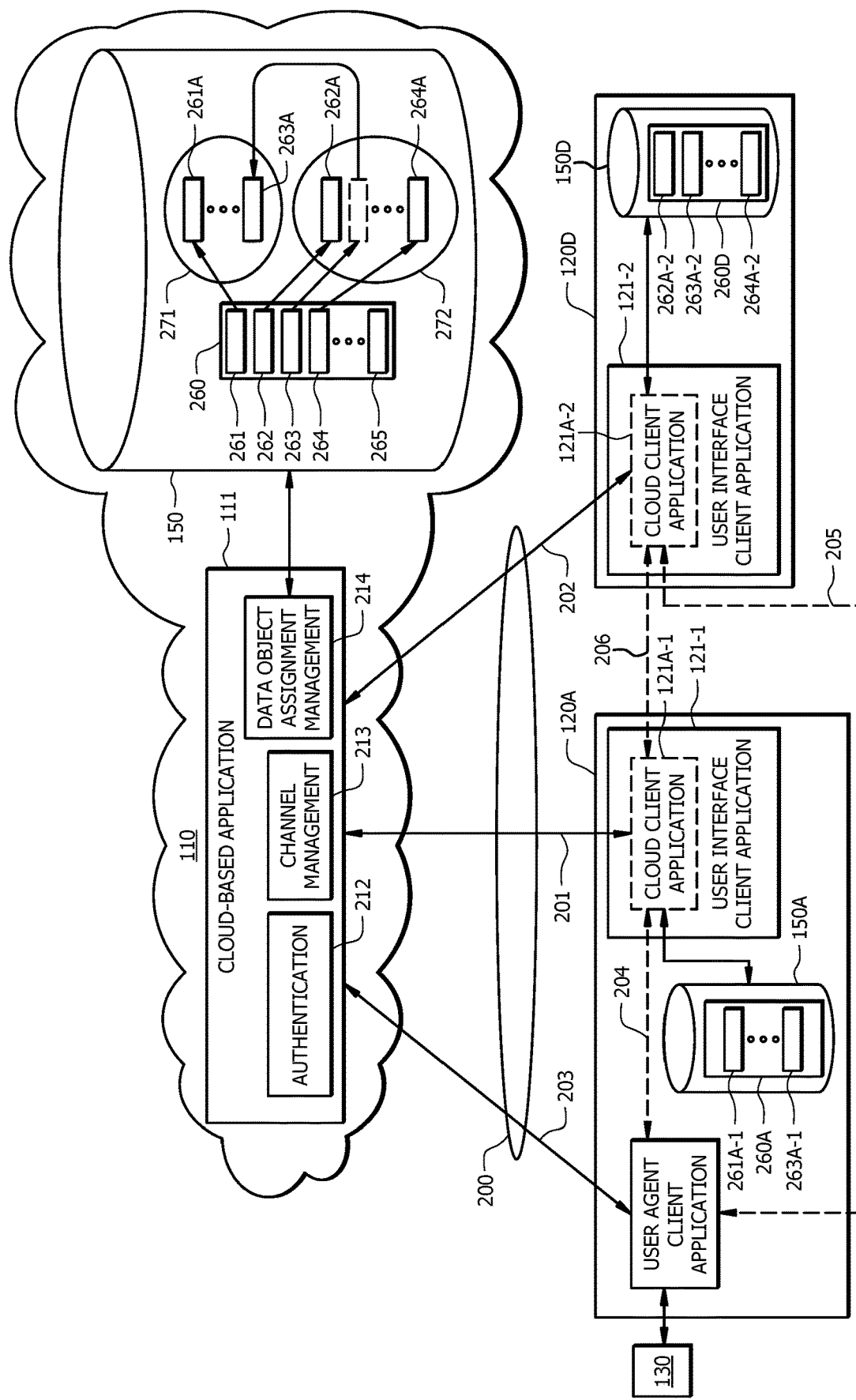
FIG. 2 shows further details with respect to a system adapted according to concepts of the present invention.

Instances of a user agent client application (shown as user agent client applications 122-1 and 122-2 in the embodiment of FIG. 2) may be installed upon a plurality of host systems (e.g., each of user devices 120A and 120D), to facilitate operation as described herein. A channel grouping technique may be implemented for facilitating management of data and objects in a multiuser environment, such as for providing data concurrency functionality with respect to the data of the data objects in the multiuser environment of system 100, according to embodiments herein. For example, the cloud client applications operable on the client devices may initiate and establish an open channel with the cloud-based application operable upon the cloud server, whereby messages can be sent from the cloud client application or the cloud-based application at any time. A plurality of the aforementioned channels may be bundled to provide a grouped channel, such as to facilitate interaction and functionality for a number of affiliated users (e.g., employees of a same company, members of a family, etc.).

In operation according to embodiments, communication is provided between the cloud client applications of system 100 (e.g., cloud client applications 121A-1 and 121A-2), user agent client applications of system 100 (e.g., user agent client application 222), and cloud-based application 111 using inter-process communication flows anchored with network sockets (e.g., Internet sockets based on the Berkeley sockets standard) at the respective cloud client applications, user agent client applications, and cloud-based application. Accordingly communication links 201, 202, and 203 of the illustrated embodiment may comprise socket pairs facilitating secure inter-process communications. Cloud client applications and user agent client applications may, for example, initiate and establish an open channel (e.g., comprising a communication link of communication links 201, 202, and 203) with cloud-based application 111, whereby messages can be sent from the cloud client application, user agent client application, or the cloud-based application at any time. The user, cloud client application, and/or user agent client application may be authenticated, such as by operation of authentication module 212 using various user name/account and password credentials, biometric credentials, digital signature credentials, cryptographic key credentials, etc., in order to verify the user, cloud client application, and/or user agent client application's authorization to access the cloud-based application and/or functions thereof, to establish the secure channel, etc. Operation of the channel may be managed, such as by operation of channel management module 213, to maintain/terminate the channel as appropriate, to control communications transmitted via the channel, etc.

A plurality of the aforementioned channels may be bundled to provide a grouped channel according to embodiments herein. For example, authentication module 212 may identify particular users, cloud client applications, and/or user agent client applications as being associated with a same group and thus provide grouping of the channels provided thereto, such as represented by channel group 200. The communications provided via the various channels of the channel group may comprise various directives, notifications, data, etc. for implementing functionality of the cloud-based application by or on behalf of the affiliated users thereof. Channel management module 213 may operate to arbitrate communications transmitted via a channel of the channel group to direct the appropriate communications to another channel of the channel group, thereby providing virtual communication links between various ones of the client applications (examples of such virtual communication links being shown as virtual communication links 204, 205, and 206).

The foregoing channel grouping technique is utilized according to embodiments of the invention in providing data concurrency. For example, channel group 200 may be utilized to provide data concurrency with respect to cloud client applications 121A-1 and 121A-2 as user interaction with one or more such cloud client application results in changed or updated data. In particular, although cloud client applications 120 may locally store instances of data of cloud-based application 111, such as for display to a user, for use in local processing, etc., that data may be updated, revised, deleted, or otherwise changed by operation of processes of cloud-based application 111, by operation of another cloud client application, and/or by operation of a user agent client application, thereby rendering such local instances of data stale (i.e., out of date or otherwise inaccurate). Open channel communications provided by the channels of a channel group, such as channel group 200, are utilized according to embodiments to provide refreshed data for updating the aforementioned local instances of data (e.g., in real-time or near real-time) to thereby provide data concurrency within the multiuser environment.

Continuing with the foregoing exemplary shipping management system functionality, a first user may interact with cloud client application 121A-1 executing on user device 120A to process one or more order managed by shipping management functionality of cloud-based application 111. For example, the first user may process the order for shipment and thus designate the order as "shipped". A local instance of shipping status data of a record for the order stored by cloud client application 121A-1 (e.g., order record 263A-1 stored in database 260A of storage 150A) may thus be updated to reflect the order has been shipped. Accordingly, a user interface screen of user device 120A may thus correctly indicate the "shipped" status of the order. However, a second user may have utilized user device 120D to have previously accessed data of cloud-based application 111 (e.g., any or all of order records 261-265 stored in database 260 of storage 150), and thus a local instance of the data for the order processed by the first user may be stored by cloud client application 121A-2 (e.g., order record 263A-2 stored in database 260D of storage 150D). Having been obtained from cloud-based application 111 prior to the designation of the order as "shipped", this local instance of the order data at user device 120D would not correctly indicate the status of the order. However, in operation according to embodiments herein, cloud client application 121A-1 utilizes open communications of communication link 201 to provide the updated order status data to cloud-based application 111 (e.g., in real-time or near real-time). Correspondingly, channel management module 213 of cloud-based application 111 utilizes open communications to broadcast information regarding such revised or updated data to other nodes of system 100 (e.g., all of user devices 120 which are part of channel group 200) to provide the updated order status data (e.g., to cloud client applications 121A-2 and 121A-2). A user interface screen of user device 120D may, for example, thus correctly indicate the "shipped" status of the order (e.g., in real-time or near real-time). Users within the multiuser environment of system 100 may thus be provided up-to-date information despite the distributed topology of the cloud client application, user agent client application, and cloud-based application implementation of the illustrated embodiment. User devices receiving messages which are published to the channel group may ignore messages that are not application to the data that is currently being handled, presented, etc. by that user device.

Embodiments of the invention may operate to provide for more selective transmission of such revised or updated data to various nodes, if desired. For example, channel management module 213 of cloud-based application 111 may utilize communications links coupled to nodes having local instances of the affected data (e.g., communication link 202 coupled to user device 120D) to direct the updated order status data to the appropriate user device(s) (e.g., using unicast or multicast techniques). Accordingly, appropriate users within the multiuser environment of system 100 may be provided up-to-date information despite the distributed topology of the cloud client application, user agent client application, and cloud-based application implementation of the illustrated embodiment.

The foregoing example is, of course, but one example of data concurrency that may be provided using the grouped channel communication techniques herein. Accordingly, it should be appreciated that other forms of status data may be provided concurrency according to embodiments. For example, where a purchaser cancels an order, a first user of system 100 may designate the order as "cancelled", whereby a local instance of the order data accessed by a second user of system 100 is updated in real-time or near real-time to properly reflect the cancelled status. Similarly, a first user of system 100 may determine that a failure of payment or other issue is present with respect to an order and thus designate the order as "on hold", whereby a local instance of the order data accessed by a second user of system 100 is updated in real-time or near real-time to properly reflect the hold status. It should further be appreciated that forms of data other than the foregoing exemplary status data may be provided concurrency according to embodiments of the invention. For example, concurrency may be provided with respect to original or primary data of a record, such as where a field is initially populated with data. An example of such initial population of data in a record field is providing the weight of a shipment (e.g., using a scale embodiment of computing resource 130 to provide weight data to user agent client application 222), whereby the weight data is used to populate a shipping weight field of an associated order record. Another example of data for which concurrency may be provided according to embodiments is the data object assignment data, container assignee data, and/or force directive data utilized with respect to assignment of one or more data objects, as described further below.

In addition to or in the alternative to the foregoing data concurrency operation, embodiments of the invention are adapted to provide assignment of one or more data objects for facilitating management of functionality provided with respect to the data objects. In providing data object assignments, various data object assignment containers may be created for storage of instances of assigned data objects. In operation according to embodiments, a container assignee is designated for each of the data object assignment containers.

The data objects associated with a data object assignment container are assigned to the designated container assignee of embodiments. Particular data objects may be selected and associated with a data object assignment container, such as for performing one or more tasks with respect to the selected data objects by the corresponding container assignee. Such pre-creation of data object assignments to assignees may be utilized to facilitate multiple users of system 100 using functionality provided with respect to the data objects without undesired duplication of tasks and/or other conflicts between the users.

Assignment of data objects to particular users may be utilized in allowing users to pre-create "ownership" of data objects prior to processing by the "owner". Continuing with the shipping management system example, users may wish to queue several order shipping jobs together, such as for shipping label generation. However, such queueing may present data concurrency issues and issues with respect to multiple users simultaneously performing tasks with respect to those same orders (e.g., due to latency involved in queueing the orders and performing the tasks necessary for each such queued order). The data object assignment containers, and data object assignments provided thereby, of embodiments herein may be utilized to coordinate processing of orders (or other data objects), provide multiuser visibility into order assignments, provide real-time or near-real time updates with respect to assignment and order processing, prevent duplicated assignments for exception cases, and/or the like.

In operation according to embodiments, data objects which are associated with a data object assignment container for which one or more tasks or other operations corresponding to the data object assignment remains to be performed or completed may only be associated with one such data object assignment container. That is, the association of data objects with a data object assignment container of embodiments operates to assign the data objects to a designated container assignee for performing the one or more tasks and prevents simultaneous assignment of that same data object to another assignee for performing the one or more tasks. A data object may, however, be removed from association with one data object assignment container for which one or more tasks remains to be performed and subsequently associated with another data object assignment container for which one or more tasks remains to be performed, according to embodiments of the invention.

The assignments made in operation according to embodiments of the invention are not limited to the particular embodiments described above. For example, various project assignments, wherein any particular project may comprise one or more tasks and/or other operations (e.g., a workflow), may be provided with respect to particular users or groups of users. Project assignments according to embodiments may provide for assigning one or more tasks to a user, such as by associating a data object or data objects with a data object assignment container for the project. Various information regarding the project and/or tasks thereof, such as the assignee, individual tasks to be performed, a due date for completing one or more of the tasks, etc., may be provided in association with the data object assignment container (e.g., as data object assignment data and/or container assignee data of the data object assignment container). Thereafter, the assignee, the assignor, and/or other users of the system may utilize (e.g., access) the data object container to manage the one or more tasks or otherwise obtain information regarding the performance, status, assignment, etc. of the one or more tasks. For example, the assignee may perform the one or more tasks, whereby status information regarding such tasks is updated.

Specific examples of the foregoing task assignments may include a task for a particular user to follow up on the status of a particular shipment (e.g., a shipment to an important customer, a shipment of an unusually expensive or rare item, etc.), a task to collect data regarding a particular product (e.g., weigh or measure a newly added product to populate one or more field of a shipping information database, determine suitable packaging for shipping a newly added product to populate one or more field of a shipping information database, etc.), a task to contact a customer (e.g., to verify an address that appears to be incomplete, to correct an error determined when address information was verified through a postal database, to confirm an order is not fraudulent, etc.), and/or the like. It should be appreciated that some of the foregoing task assignments may provide "ownership" of a data object with respect to the assignee (e.g., until the tasks, or some portion thereof, is completed) whereby assignment of those data objects to another user and/or other access to those data objects for performing other (e.g., conflicting) tasks is prevented or avoided. For example, task assignments for processing of an order for shipment may be prevented in light of a task assignment to a user to contact a customer due to possible fraud with respect to the order. Alternatively, some of the foregoing task assignments made according to embodiments may not provide "ownership" of data objects to particular users, such as to facilitate multiple users performing non-mutually exclusive or non-conflicting tasks with respect to data objects. Assignment of such non-exclusive or non-conflicting tasks according to embodiments, allows other users to perform tasks and/or to be assigned tasks with respect to those objects even while the assigned tasks, or some portion thereof, remain uncompleted.

It should be appreciated, particularly in light of the foregoing task assignment examples, that the data objects for which assignments are made (or which are otherwise placed in or associated with data object assignment containers) are not limited to any particular type of data object. For example, although embodiments have been described herein with reference to data objects which comprise order data (e.g., order data objects), embodiments of the invention may similarly be utilized to provide assignment with respect to data objects comprising customer data (e.g., customer data objects), data objects comprising product data (e.g., product data objects), etc.

Using the data object assignment containers and task assignments according to embodiments herein, a unified task system may be provided whereby a user may log into the system to see all the tasks that have been assigned to them. Similarly, an assignor or other manager may access the system to see all the tasks (or perhaps all uncompleted tasks) that have been assigned, the status of the tasks, the tasks assigned to any particular user, who has the most tasks assigned to them, who has uncompleted tasks, which tasks are overdue, etc.

Figure 3:
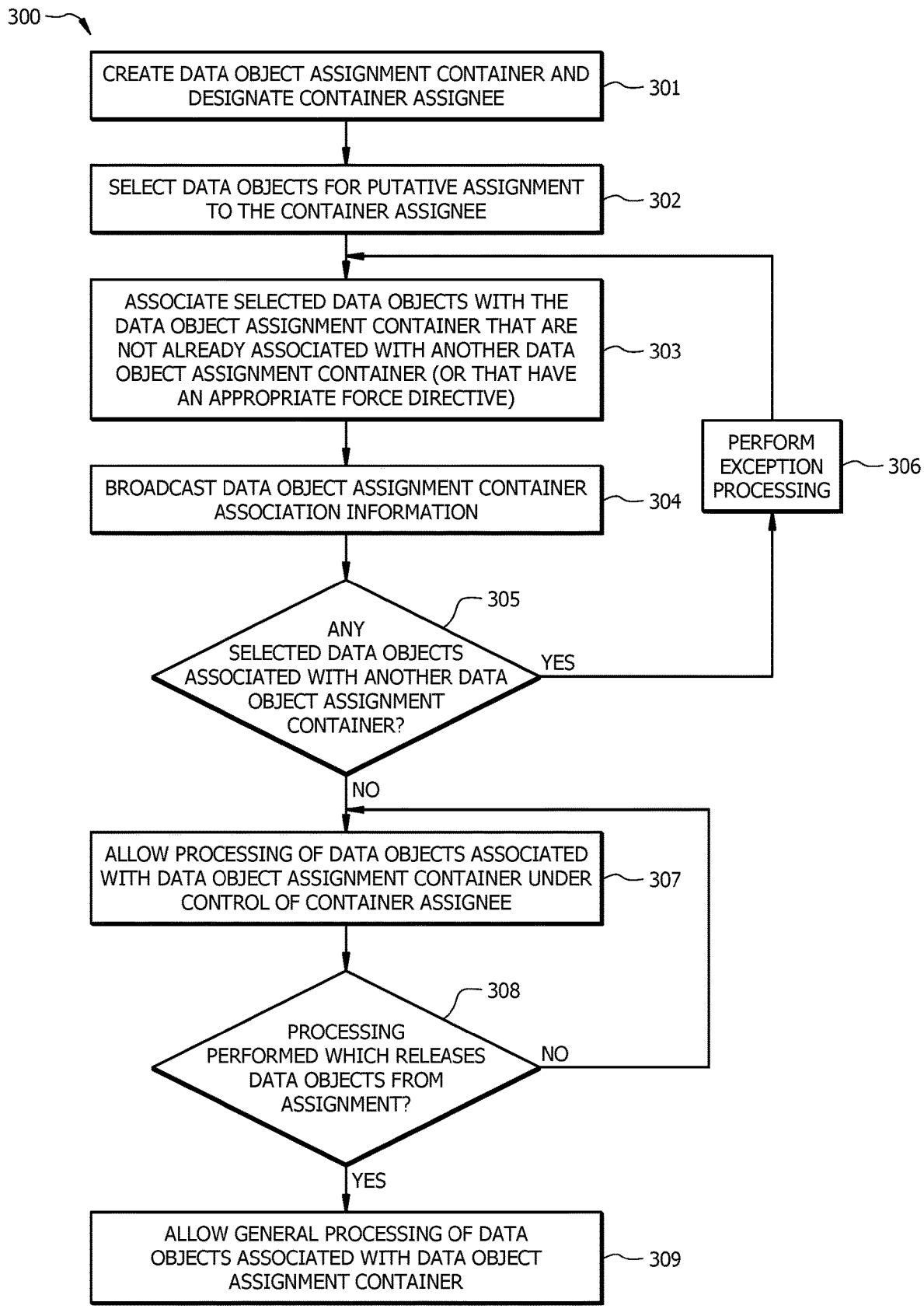
FIG. 3 shows operation providing assignment of one or more data objects according to concepts of the present invention.

Directing attention to FIG. 3, flow 300 shows operation according to embodiments providing assignment of one or more data objects for facilitating management of functionality provided with respect to the data objects. Operations of flow 300 may, for example, be implemented by execution of code of cloud-based application 111, cloud client applications 121, and/or user agent client applications 222 according to embodiments of the invention. For example, logic of data object assignment management module 214, preferably operable in cooperation with logic of instances of cloud client applications 121, may operate to perform functions of the illustrated embodiment of flow 300.

At block 301 of the illustrated embodiment of flow 300, a data object assignment container is created for use in assignment of one or more data objects to a user or other assignee. For example, a user desirous of performing tasks with respect to one or more data objects may wish to assign those data objects to themselves during performing the tasks in order to avoid other users of system 100 from performing the same or overlapping tasks with respect to those data objects. Similarly, a user (e.g., a supervisor or manager) may wish to assign one or more data objects to another individual for performing tasks with respect to the one or more data objects. Irrespective of who may be desirous of assigning data objects or the purposes for which data objects may be assigned, a data object assignment container for facilitating the assignment of data objects is nevertheless created at block 301 of the illustrated embodiment. The data object assignment container may be created, for example, in response to a user selecting an appropriate control (e.g., software button, radio button, menu selection, graphical user interface icon, etc.) indicating a desire to create a data object assignment container or a desire to make assignments of data objects. Additionally or alternatively, creation of a data object assignment container may not be in response to direct control for creating a data object assignment container, but rather in response to indirect control (e.g., in response to a user selecting a control for functionality for which a data object assignment container is utilized). Accordingly, in operation according to embodiments, a data object assignment container can be manually created or automatically generated, such as by using a rules based engine to create appropriate data object assignment containers as needed or otherwise as appropriate. Irrespective of how creation of a data object assignment container is initiated, after a data object assignment container is generated, it can be assigned to a user by an administrator (or a user who has the authorization to configure assignments) or by application of assignment rules (e.g., by a rules based engine to provide data object assignment container assignments to appropriate users or groups of users).

The data object assignment container may comprise a data record stored by one or more memories, such as represented by data object assignment containers 271 and 272 stored in storage 150 of FIG. 2. Such a data record may be adapted to store instances of the data objects being assigned, identification of the data objects being assigned, flags or register bits for indicating data objects being assigned, and/or the like. The information contained within or otherwise associated with data object assignment containers of embodiments herein is not limited to the actual assignment data (e.g., data object and assignee). For example, embodiments of a data object assignment container may additionally store information regarding tasks to be performed with respect to the data objects, information regarding the current state of performance of the tasks, information regarding an expiration time or event for the assignment to the assignee and/or the data object assignment container, information regarding a state of the data objects upon which assignment terminates, etc. Continuing with the foregoing example of a shipping management system, where the data objects comprise order records which are assigned to a user for processing shipment processing, information indicating that the assignment of any data object for which status data thereof reflects a "shipped" state is to be terminated may be provided. Such information may be provided by a user when creating a data object assignment container, may be provided automatically by logic of the system (e.g., logic of data object assignment management 214 from the context in which the assignments are being made), and/or combinations thereof.

An example of a data object assignment container provided with respect to a shipping management system is shown as order assignment container 470 in FIG. 4, wherein the data objects comprise orders and the data object assignment container comprises an order assignment container. Order assignment container 470 may correspond to data object assignment container 271 or data object assignment container 272 of FIG. 2, for example.

The data object assignment container of the illustrated embodiment comprises information uniquely or substantially uniquely (i.e., unique within the context and typical operation of the shipping management system) identifying the data object assignment container (shown as an order assignment container identifier or number) and identifying the container assignee (shown as an owner's name). Such information may be utilized for identifying the orders associated with a data object assignment container, for identifying the "owner" or assignee of a data object assignment container, and/or the like. For example, from an "Order Management" screen of cloud-based application 111 and/or cloud client application 121A, a user may be provided a list of orders and order assignment container identifiers (e.g., object container numbers or other identifiers) for orders that currently reside in an order assignment container for which processing remains to be performed (e.g., an "open" object group). In operation according to embodiments, when a user places a cursor over an order assignment container identifier, the shipping management software may display the container assignee information (e.g., user's name) associated with the order assignment container and/or other information regarding the order assignment container, its assignee, and/or the orders associated therewith. It should be appreciated that embodiments herein may utilize internal identifiers that are not visible to the user to track various order assignment containers in addition to or in the alternative to the aforementioned data object assignment container identifiers and/or container assignee identifier information that is meaningful to the users.

Association of an order (data object) with the order assignment container is indicated by order identification information (shown as order numbers) in order assignment container 470 illustrated in FIG. 4. This order identification information may uniquely or substantially uniquely identify the orders as stored in another database (e.g., database 260).

Order sequence information (shown as sequence numbers) is provided in the illustrated embodiment of order assignment container 470. Such order sequence information may be utilized for indicating the order in which the objects will be processed (e.g., when generating shipping labels in batches, whereby many objects are processed in a single user operation, the resulting shipping labels may be created in a specific order as designated by order sequence information of embodiments to provide their generation in a predictable sequence). The foregoing order sequence information may not be visible to the user in operation according to embodiments, but may nevertheless be part of the data structure and may be determined or otherwise assigned based on user control or input (e.g., a user "sort" operation, such as to sort orders by recipient name, order number, item name, etc.).

Status information for the orders of order assignment container 470 illustrated in FIG. 4 (shown as brief status descriptions) is also provided in the illustrated embodiment of the order assignment container. Such status information may be utilized for determining a status of one or more tasks to be performed/having been performed with respect to an order, when an assignment of an order is to be terminated or otherwise released, etc., as discussed further below.

Status information provided with respect to objects of embodiments of the invention may not only be utilized to indicate a status of tasks to be performed/having been performed, but may additionally or alternatively be utilized to control various aspects of the presentation of the object, information regarding the object, processing of the object etc. For example, status information may indicate that an order has been cancelled or is being held (e.g., pending payment or to otherwise resolve an issue prior to further processing of the order). When an item is cancelled or held by a user, it may be displayed by being grayed out on all of the users' browsers to prevent the other users from processing an order that is either cancelled or held for some reason. Further, a "Hide" option may be provided, which when selected, may be used to hide the grayed out orders from the order assignment container window by removing the grayed out items. The hiding of orders using such an option preferably only hides the orders from the local browser display without affecting the other users' browser display (i.e., embodiments of such a hide feature applies only to the local browser window).

It should be appreciated that additional or alternative information may be included in, or in association with, data object assignment containers of embodiments herein. For example, although not shown in the embodiment illustrated in FIG. 4, an order assignment container may include date information (e.g., the date the order assignment container is created) and shipping location information (e.g., the location from which shipping of the orders is being handled), in addition to the aforementioned owner information, status information, and list of orders. Information included in, or in association with, order assignment containers of embodiments may additionally or alternatively include various notes, remarks, comments, etc. For example, in operation according to embodiments, a user can add notes to an object in a data object assignment container from a data object assignment container window displaying a list of the objects. Information for a data object assignment container may provide status information regarding the data object assignment container and/or the objects therein. For example, a user may mark a data object assignment container as having been processed (e.g., shipping labels for all objects therein having been printed), data object assignment containers for which processing has been completed may be designated for archiving using such information, etc. The various status information provided according to embodiments of the invention may be additionally or alternatively utilized for performing searches, such as to search for historical container assignments, to search for all containers/objects assigned to a particular user, etc.

In operation according to embodiments of the invention, some portion of the information useful in providing such operation may additionally or alternatively be stored elsewhere within system 100. For example, information utilized in providing functionality as described herein may be stored within the cloud environment (e.g., within database 260), local to users (e.g., within databases 260A and/or 260D), etc.

Although data object assignment containers 271 and 272 are shown stored in the cloud environment of network 110, it should be appreciated that data object assignment containers may additionally or alternatively be stored elsewhere, such as locally with respect to a creating user, an assignee of the data objects, etc. For example, data object assignment containers of embodiments may be stored locally to any or all of user devices 120 (e.g., within storage 150A of user device 120A and storage 150D of user device 120D), if desired. The aforementioned channel grouping techniques may be utilized to provide data concurrency with respect to such data object assignment containers, the assignees thereof, assignment of data objects in association with the data object assignment containers, etc.

A data object assignment container may be devoid of data objects or data object information when initially created. That is, there may be no data objects selected or otherwise identified for assignment, and thus no instances of data objects or data object identification information initially included in a data objet assignment container. The object assignment container of embodiments, however, provides a means by which data objects may be assigned and/or demarcated as assigned to a particular assignee (e.g., an individual responsible for performing one or more tasks associated with the data object). Accordingly, an assignee for the data objects ultimately to be associated with the data object assignment container is preferably designated for each data object assignment container. In block 301 of the illustrated embodiment of flow 300, a container assignee is designated in association with the creation of the data object assignment container. For example, a user creating the data object assignment container may be presented with a dialog box for selecting a user of system 100 to be designated as the container assignee for that data object assignment container. In operation according to embodiments, a container assignee for a data object assignment container may default to a user causing the creation of the data object assignment container. Such a container assignee may be changed or re-designated, whether at the time of creation of the data object assignment container or at some other time in its existence, such by the creating user, the designated assignee, a user with sufficient access rights (e.g., a manager or supervisor), etc.

In accordance with embodiments of the invention, the container assignee is a single individual or user of system 100. For example, in the foregoing example of shipping management system functionality being provided by cloud-based application 111, a container assignee may be a salesman or order processor tasked with processing one or more orders corresponding to order records comprising the data objects assigned or to be assigned. Likewise, a container assignee may be warehouse personnel tasked with picking and packaging product of one or more orders corresponding to order records comprising the data objects assigned or to be assigned. As a further example, a container assignee may be a shipping clerk tasked with generating and affixing shipping labels to packages of one or more orders corresponding to order records comprising the data objects assigned or to be assigned.

Although a container assignee of embodiments may be a single individual or user, some embodiments of the present invention may provide for a container assignee comprising multiple individuals or users of system 100. For example, a team or group of individuals (e.g., a sales persons group, a team of warehouse personnel, a group of shipping clerks, etc.) may be designated as a container assignee, such as where the team or group of individuals employs management and/or communication processes to coordinate their efforts with respect to the data objects assigned or to be assigned. Nevertheless, whether the designated container assignee is a single individual or a group of individuals, embodiments of the invention operate to prevent further assignment of data objects associated with the data object assignment container (e.g., as may result by association of one or more of the same data objects with another data object assignment container) while the assignment of the data objects to the container assignee remains valid (e.g., the data object assignment container is existing and/or active, such as where one or more outstanding data object tasks corresponding to the data object assignment container and/or data objects therein remains to be completed, as will be better understood from the discussion which follows.

Having created a data object assignment container and designated a container assignee with respect to the data objects assigned or to be assigned, processing according to the illustrated embodiment of flow 300 proceeds to block 302 wherein one or more data objects are selected or otherwise identified for assignment to the container assignee. A user may, for example, select the one or more data objects (e.g., by checking a corresponding selection box or radio button, by highlighting displayed instances of the data objects, etc.) and indicate that the selected data objects are to be associated with or added to the data object assignment container (e.g., selecting a soft button, dragging and dropping the displayed instances of the selected data objects into a displayed instance of the data object assignment container, etc.) to thereby putatively assign those data objects to the container assignee.

In operation according to embodiments, various optical, digital, aural, or other input means may be utilized for identifying or otherwise selecting data objects for associating with or including in a data object assignment container. For example, a user may scan printed orders or invoices having a barcode or other machine readable information to move the orders from an "Order Management" screen of a shipping management system to an order assignment container window. Such a scanning feature may simplify the order management process for some users, such as where the users print orders or invoices first to verify that the items are in stock for shipment before printing shipping labels for their shipment. Accordingly, in this type of order fulfillment processes, it may be more efficient to allow the user to move the items from the "Order Management" window using the barcode scanning feature rather than making the user manually match the items on the invoice to the items on the "Order Management" window.

It should be appreciated that, although the operations for creating a data object assignment container and selecting data objects for assignment to the container assignee are illustrated in separate functional blocks (i.e., blocks 301 and 302) of flow 300 illustrated in FIG. 3, the concepts of the present invention are not limited to such an implementation. As previously mentioned, creation of a data object assignment container may be in response to a user indicating a desire to make assignments of data objects. For example, a user may select one or more data objects (e.g., invoking functionality described above with respect to block 302), simultaneously or thereafter indicating a desire to assign those data objects (e.g., invoking functionality described above with respect to block 301), whereby a data object assignment container may be generated in response to such selection of data objects for assignment. Accordingly, continuing with the above example of a shipping management system, when a displayed instances of a data object for one or more orders is selected, in addition to the user being allowed to manage shipping settings, customer data, etc. consistent with the shipping management functionality, but the data objects for the displayed instances of the order data objects can be added or moved to a new or existing data object assignment container for assignment to a container assignee.

The assignment of selected data objects to a container assignee in operation according to block 302 of embodiments of the invention provides for putative or tentative assignment of those data objects. In particular, the assignment of data objects to a container assignee in accordance with embodiments of the invention prevents simultaneous assignment of those same data objects to another container assignee, at least until particular tasks and/or another event (e.g., releasing the objects for subsequent assignment) associated with those objects have been completed. For example, through controlling the assignment of data objects to assignees, the multiple users of a multiuser environment are enabled to utilize the functionality provided with respect to data objects in a multiuser environment without duplication of tasks and/or undesired conflicts between the users. Accordingly, further processing with respect to the selected data objects and their association with the data object assignment container is performed in accordance with the embodiment of flow 300 of FIG. 3 prior to actual assignment of those data objects to a container assignee.

At block 303 of the illustrated embodiment of flow 300 each of the selected data objects is analyzed to determine if the data object is currently assigned. For example, logic of data object assignment management module 214 may access data stored by storage 150 (e.g., database 260 storing data objects 261-265 and data associated therewith, such as data object assignment containers 271 and 272) to determine if a selected data object is then presently assigned. In operation according to embodiments, existing and/or active (e.g., all outstanding data object tasks corresponding to the container/ previous assignment have not been completed) data object assignment containers may be analyzed to determine if a selected data object is associated therewith (e.g., an instance of the data object or identification of the data object, such as represented by data object instances 261A-264A, is stored in a data object assignment container). The data objects that are not already associated with another existing and/or active data object assignment container, and thus are not already assigned to a container assignee, are associated with the data object container at block 303 of the illustrated embodiment, thereby assigning these data objects to the container assignee for that data object assignment container. For example, an instance of the data objects, or information identifying the data objects, that are not already associated with another existing and/or active data object assignment container may be stored in the data object assignment container (e.g., as data object instances 261A and 263A stored in data object assignment container 271 or as data object instances 262A and 264A stored in data object assignment container 272).

Association of data objects with a data object assignment container, and correspondingly assigning the data objects to a container assignee, may result in a visual or other indication of the assignment being provided. For example, instances of the assigned data objects displayed to the user making the assignments may be demarcated as assigned, such as by adding a visible flag or icon (e.g., an icon representing an assignee) in association with the displayed instance, by changing a color of the displayed instance of the data object (e.g., red colored data object instances may represent unassigned data objects, black colored data object instances may represent data objects assigned to other users, and blue colored data object instances may represent data objects assigned to the user), by rendering the displayed instance of the data object unselectable (e.g., by "graying" out the displayed instance of the data object), by changing a size or shape of the displayed instance of the data object (e.g., to render displayed instances of assigned data objects smaller than displayed instances of unassigned data objects), and/or the like.

As previously mentioned, operation in accordance with embodiments of the invention provides for data concurrency within the multiuser environment of system 100. Accordingly, the change in the assigned state of data objects is preferably propagated to appropriate nodes within the system. In operation according to the illustrated embodiment of flow 300, information regarding the association of data objects with a data object assignment container, preferably including information regarding the assignee of the assigned data objects, is broadcast to one or more nodes within system 100 (e.g., the cloud client application of the assigning user and/or the cloud client application of one or more users accessing an affected data object) at block 304. For example, the aforementioned channel grouping technique may be utilized by data object assignment management module 214 to provide the updated assignment data for affected data objects to one or more of cloud client application 121A-1, cloud client 121A-2, and user agent client application 222, whereby instances of the assigned data objects displayed to the user making the assignments may be demarcated as assigned in real-time or near-real-time.

As an example of operation provided in accordance with blocks 303 and 304 of embodiments, a user can drag and drop orders from an "Order Management" screen of a shipping management system to an order assignment container window to inform the other users that the moved orders are being processed. The moved orders in the order assignment container window can be isolated by grouping for easier processing. Such a grouping feature may be utilized to improve the processing time, such as by eliminating the need for the user to search for the next order to process. For example, a user can group orders with an insurance option by moving them to the order assignment container window and processing those orders together. Since an order can be moved to only one order assignment container in operation according to embodiments, other users may be prevented from unknowingly processing and shipping the same orders (e.g., prevented from printing shipping labels for the particular orders) multiple times. Furthermore, operation according to the foregoing prevents users from working with the stale data, whereby ta shipping management system can broadcast to the other browsers (e.g., using group channels) to update in a real time when the items are moved to the order assignment containers.

Updating of data to reflect the assignment of one or more of the selected data objects is not limited to updating instances of the data objects at the user devices of system 100. In operation according to embodiments, data records for the data objects (e.g., the primary data records stored in database 260) may be updated to reflect assignment of the particular data objects. For example, a flag or register of the data records or which is associated with the data records may be updated to reflect an assigned state, such as to indicate that an appropriate data object assignment container should be accessed to determine particulars of the assignment (e.g., assignee, pending tasks for the assignment, etc.).

At block 305 of the illustrated embodiment of flow 300, a determination is made as to whether any of the selected data objects were found to have already been assigned (e.g., associated with another existing and/or active data object assignment container), as may have been indicated from the analysis performed at block 303. In operation according to the illustrated embodiment, if it is determined that one or more of the selected data objects have already been assigned (e.g., were assigned prior to their selection for assignment at block 302) processing proceeds to block 306 wherein exception processing is performed.

Exception processing provided with respect to data objects selected for assignment, but which are already assigned, preferably operates to ensure that data objects are not simultaneously actively assigned to multiple assignees or simultaneously provided conflicting assignments (e.g., simultaneous assignments for performing the same or overlapping tasks with respect to the data objects). However, embodiments of the invention are adapted for facilitating management of data and data objects in a multiuser environment and thus accommodate reassignment of data objects, where appropriate. Accordingly, exception processing provided at block 306 of embodiments may, for example, provide the user having selected the data objects with a listing or other information regarding the selected data objects which have existing assignments or otherwise conflicting assignments. The information provided may comprise identification of the exception data object, the current/existing assignee for the exception data object, information regarding tasks being performed and/or to be performed with respect to the exception data object, information for facilitating the reassignment of the exception data object, and/or the like. Such information may be provided solely for informational purposes, such as to inform a user that their desire to assign certain of the selected data objects to a container assignee is not possible due to a conflict, such as where the user does not have reassignment authority or requisite rights within system 100. However, such information is preferably provided for facilitating management of the assignments according to embodiments of the invention. For example, a user having appropriate reassignment authority or requisite rights within system 100 may be permitted to select one or more of the exception data objects (i.e., those data objects of the selected data objects for which a conflicting assignment was identified) may be provided with the opportunity to cause selected ones of the exception data objects to nevertheless be assigned to the container assignee.

It should be appreciated that the foregoing exception processing provides an embodiment wherein data objects may be assigned to a single active data object assignment container (i.e., a data object assignment container for which one or more tasks or other action remains to be performed), such as for use in assigning tasks for which conflicting tasks or other processing is to be prevented or otherwise avoided. In operation according to embodiments, data objects may nevertheless be assigned to multiple inactive data object assignment containers (e.g., assigned to one active data object assignment container and simultaneously to one or more data object assignment container for which all tasks or other data object actions associated therewith have been completed). Moreover, embodiments may facilitate association of a data object with a plurality of active data object assignment containers, where those data object assignment containers have non-mutually exclusive tasks associated therewith. For example, the determination at block 305 may be made with respect to whether any tasks of an active data object assignment container to which the data object has already been associated conflicts (e.g., utilizing a database of compatible tasks suitable for simultaneous assignment and/or incompatible tasks unsuitable for simultaneous assignment).

As an example of exception processing according to embodiments herein, assume that data object assignment container 271 has been created at block 301 for use in assigning data objects to a designated container assignee. In this example, data objects 261 and 263 may have been included in the selected data objects for assignment to the container assignee at block 302. However, in this example, data object 263 has already been assigned to another assignee, as may be indicated by an instance of data object 263 being present in another data object assignment container (e.g., data object assignment container 272). Accordingly, although processing at block 303 may result in data object 261 being assigned to the designated container assignee (e.g., data object instance 261A is added to data object assignment container 271), data object 263 is determined to have an assignment conflict and is identified as an exception data object (e.g., is not assigned to the designated container assignee) at block 305 of this example. Accordingly, processing at block 306 may present the user who selected data objects 261 and 263 for assignment with a list of exception data objects which includes data object 263 and allow the user to take action with respect to these exception data objects. For example, the user may be queried or otherwise permitted (e.g., by selecting a check box or radio button corresponding to an exception data object) to cause one or more exception data object to have its previous assignment revoked and assignment to the designated container assignee made. This operation is represented in FIG. 2, whereby data object instance 263A is moved from data object assignment container 272 into data object assignment container 271.

The above described reassignment of data objects is operable to avoid simultaneous conflicting assignments of the data objects while facilitating data management and utilization of the data objects within the multiuser environment of system 100. For example, continuing with the example of a shipping management system, particular personnel (e.g., warehouse or shipping personnel) may be assigned tasks with respect to an order represented by a data object, such as picking, packaging, and shipping the ordered items. However, the particular personnel having the assignment may be unexpectedly unavailable (e.g., due to illness or an emergency arising), and thereby unavailable for timely completing the tasks. Reassignment of the data objects may be utilized according to embodiments of the invention to facilitate timely completion of the task by alternative personnel while continuing to implement techniques for avoiding duplication of the tasks.

It should be appreciated that exception processing operation in accordance embodiments of the invention is not limited to reassignment of exception data objects in response to a user indicating a desire to have the exception data objects reassigned. Embodiments may, for example, provide information regarding the exception data objects and default to reassigning the exception data objects to the designated container assignee while allowing the user to select one or more exception data object to remain with an existing assignee (e.g., to opt-out of reassignment).

Exception processing to cause selected ones of the exception data objects to be reassigned may operate to invoke assignment control signaling according to embodiments. For example, where an exception data object is to be reassigned to the designated container assignee, exception processing provided in accordance with embodiments herein may provide an appropriate force directive in association with that exception data object. Such a force directive may comprise metadata associated with the exception data object, a flag or register set with respect to the exception data object, a data field in the exception data object record (e.g., within database 260), and/or the like. Irrespective of the particular implementation, such a force directive provides control signaling facilitating the reassignment of the exception data object in operation of flow 300 of embodiments herein.

Having performed exception processing at block 306, processing according to the illustrated embodiment of flow 300 returns to block 303 for implementing further operations with respect to exception data objects in accordance with the exception processing. For example, where the exception processing at block 306 provides for an exception data object to be reassigned to the designated container assignee (e.g., provides the aforementioned force directive in association with one or more exception data object), processing at block 303 may provide the reassignment of the appropriate exception data object. In operation according to embodiments, each of the exception data objects is analyzed to determine if the data object is to be reassigned or to remain with an existing assignment. For example, logic of data object assignment management module 214 may access data stored by storage 150 (e.g., database 260 storing data objects 261-265 and data associated therewith, such as data object assignment containers 271 and 272) to determine if an exception data object has a force directive associated therewith. The exception data objects that are to be reassigned are associated with the data object container at block 303 of embodiments, thereby assigning these data objects to the container assignee for that data object assignment container. For example, an instance of those exception data objects, or information identifying those exception data objects, may be moved from a current data object assignment container and stored in the data object assignment container. The exception data objects that are not to be reassigned (e.g., exception data objects without a force directive associated therewith) are preferably removed from the data objects selected for assignment to the designated container assignee to thereby avoid further assignment processing with respect thereto.

Having performed operation to reassign any of the exception data objects to the designated container assignee at block 303, processing according to the illustrated embodiment of flow 300 returns again to block 304 wherein any such data object assignments (reassignments) are broadcast, as described above. Of course, where no exception data object is designated for reassignment, operation at block 304 may omit the aforementioned information broadcast.

After returning to block 304, processing according to the illustrated embodiment proceeds to return to block 305 for a determination as to whether any of the excepted/selected data objects remain to be assigned. Exception processing according to embodiments of the invention operate to delete those exception data objects for which reassignment is not desired from the selected data objects. Thus, upon returning to block 305 after exception processing according to embodiments none of the data objects are expected to be found to remain having already been assigned or otherwise unassigned by operation of flow 300. Accordingly, processing may proceed to block 307 of flow 300. Likewise, in an initial iteration of processing according to block 305 of the illustrated embodiment, if it is determined that none of the selected data objects were found to have already been assigned (e.g., none are associated with another existing and/or active data object assignment container), as may have been indicated from the analysis performed at block 303, processing proceeds to block 307.

Upon completion of processing at block 305 when none of the excepted/selected data objects remain to be assigned, assignment of data objects to the designated container assignee has been completed. Accordingly, the further processing of blocks 307-309 of flow 300 illustrated in FIG. 3 provides for utilization of the data objects in the multiuser environment in accordance with the assignments. It should be appreciated, however, that although the processes implemented regarding assignment of data objects in the illustrated embodiment have been described with reference to initially creating a data object assignment container and the initial association of data objects therewith, the assignment and/or unassignment of data objects to a designated container assignee (e.g., by association and/or disassociation of data objects with the data object assignment container) at various times throughout the existence of a data object assignment container.

In providing for utilization of the data objects in accordance with the assignments, and avoiding multiple users utilizing the data objects to perform the same or overlapping tasks simultaneously, operation at block 307 of the illustrated embodiment allows processing of data objects associated with the data object assignment container(s) under control of data object assignment management module 214. For example, if a user attempts to utilize a data object, or data thereof, in a manner inconsistent with an existing and/or active assignment of the data object (e.g., the user is not the assignee for the data object and/or the user is attempting to perform a task which conflicts with a task associated with the assignment to another user), logic of data object assignment management module 214 preferably detects the conflict and prevents the user from accessing the data object, or data thereof, prevents the user from performing the task, or otherwise inhibits conflicting use of the data object. In contrast, if a user attempts to utilize a data object, or data thereof, in a manner consistent with an existing and/or active assignment of the data object (e.g., the user is the assignee for the data object and/or the user is attempting to perform a task which consistent with the assignment), logic of data object assignment management module 214 preferably detects that there is no conflict and allows performance of the task. In making the foregoing determinations regarding assignments and task conflicts, data object assignment management module 214 preferably accesses the data object assignment containers to determine assigned data objects, data object assignees, status of assignments, tasks associated with assignments, status of tasks, status information of the data object, and/or other information useful in providing operation as described herein. For example, in operation according to embodiments, in order to prevent printing multiple shipping labels for the same order, the shipping management system software may check the status of the order before calling a third party API to generate a shipping label for that order.

It should be appreciated that the foregoing operation may be utilized to present information regarding the various items to users in a number of ways to facilitate management of functionality provided with respect to data objects herein. For example, operation in accordance with the foregoing may allow a user to isolate orders by dragging and dropping the orders from an "Order Management" screen of a shipping management system to an order assignment container window, whereby the user can choose to work with the orders in the order assignment container by selecting a "Full View" option from the order assignment container window to display only the selected/assigned orders on the "Order Management" screen. Such a feature allows the user to avoid processing the wrong items, as well as facilitating the user focusing only on the orders that need to be processed by that user.

In operation according to the exemplary embodiment of FIG. 3, processing proceeds to block 308 to determine if processing has been performed which releases the data objects from their assignments. For example, the assignment of data objects to a particular designated container assignee may be expressly terminated, such as through a user removing the data objects from the data object assignment container. Similarly, the assignment of data objects to a particular designated container assignee may be indirectly or naturally terminated, such as by time or event based expiration of the data object assignment container, completion of all tasks associated with the assignment, a particular status being indicated within the data of data objects, etc. Processing with respect to particular data objects not have been released from assignment returns to block 307 to continue processing of data objects associated with the data object assignment container(s) under control of data object management module 214 (i.e., consistent with the data object assignments). However, for particular data objects which have been released from assignment, processing according to the illustrated embodiment proceeds to block 309 wherein general processing of those data objects is allowed (e.g., independent of or without regard to data object assignments). As can be appreciated from the foregoing, such operation facilitates multiple users of system 100 using functionality provided with respect to the data objects without undesired duplication of tasks and/or other conflicts between the users.

Management of functionality provided with respect to data objects provided in accordance with embodiments of the foregoing, wherein particular data objects are associated with a data object assignment container for performing of one or more tasks by a container assignee, allows various users to process actions with respect to objects despite the objects associated with a data object assignment container being assigned to a different, designated container assignee. That is, while a user assigned to a particular data object assignment container is processing an item in that data object assignment container, different users may nevertheless process certain other actions with respect to the item, according to embodiments. For example, a different user may cancel an order using shipping management software from a browser window. When the order is cancelled, the shipping management software operating in accordance with concepts herein may use a group channel to broadcast to the other registered browsers that the order has been cancelled to prevent these users (including an data object assignment container assignee, such as may be otherwise processing the order for shipment) from working with stale data. After being notified that the order has been cancelled, updated information is preferably displayed on the registered browsers. In another example, users may override the current user who is assigned to process an item in an data object assignment container. When the owner or other assignee of an data object assignment container is not available to process certain items that need immediate attention, a different user can move the item to his or her data object assignment container to process the item. For example, in operation a different user may highlight the item and select a control input for adding the item to a data object assignment container assigned to that user. A warning message may be displayed on the screen indicating that this item is locked currently and it belongs to another user. However, this item may nevertheless be removed from this user using the aforementioned override feature, such as by agreeing to take the item away from the original user. Once the item is moved from the original user's data object assignment container, the order assignment container identifier is preferably updated with the new user/new data object assignment container information. Group channel calls may be used to notify the other registered browsers that there have been changes to this item.

It should be appreciated that various processing, operations, and functionality may be provided with respect to the data object assignment containers, assignee designations, and assigned data objects, in addition to or in the alternative to controlling utilization of the data objects in accordance with the assignments. For example, information regarding the data object assignment containers, assignee designations, and/or assigned data objects may be utilized in providing display of instances of the data to users of system 100. Continuing with the shipping management functionality example, within a displayed order list (e.g., a displayed list of data object instances), the user may be enabled to view any current existing/active data object assignment container for each individual order. For example, linked (e.g., blue, bold) numbers indicate may a data object assignment container for data objects that are assigned to the user, whereas black numbers may indicate a data object assignment container for data objects that are assigned to other users. Selecting a data object assignment container number (e.g., by clicking on the displayed number) for a data object assignment container of data objects assigned to that user may take the user to a view of the data object assignment container that shows the orders in the main orders list.

Additionally or alternatively, users of embodiments may choose to display a pane (e.g., on an order management screen) to show detail of orders (or other data objects) assigned to them. For example, a "widget" may be provided that allows the user to see all of their existing/active data object assignment containers including the orders (or other data objects assigned to the user) within each data object assignment container. Data objects (e.g., orders in this example) can be dragged to this area to be added to the current data object assignment container, an "Add X Orders" software button may be used to add the currently selected data objects to a data object assignment container, etc. In operation according to embodiments, a summary of the existing/active data object assignment containers is always present on the order management screen, such as to show each existing/active data object assignment container for that user with a number indicating the number of orders (or other data objects) in each. As above, data objects (e.g., orders in this example) can be dragged onto these data object assignment containers to be added, a "plus" icon may be used to add currently selected data objects to a data object assignment container, etc.

As a further example, bulk actions may be applied with respect to data objects using data object assignment containers of embodiments herein. In operation according to embodiments, a user may be allowed to select multiple objects and apply the same actions to all of the selected objects. For example, if a user wants to insure multiple order shipments using the same insurance options, he or she can select the multiple orders from the "Order Management" screen of a shipping management system or by moving the items to the order assignment container window. The user may then select an "Apply Bulk Action" option to choose the insurance options (or other bulk action to apply to the orders). After applying the insurance options to all of the selected orders, the user can also make changes to individual orders one at a time.

In utilizing data object assignment containers of embodiments herein, a user is enabled to pre-compile a group of data objects by reserving certain data objects together to process at a later time, similar to a shopping-cart concept of selecting items for future purchase and checking out when a buyer is ready. For example, a user can group overnight shipments together by pre-creating a data object assignment container, associating the data objects with the data object assignment container, and processing the data objects at a later time by selecting one or more processing actions with respect thereto at the desired time. When a user is involved in repetitive tasks, he or she can use the data object group processing features provided according to the concepts therein to expedite completing the tasks. For example, a user can create a data object assignment container and select one or more action control (e.g., a "Print" option) once to perform the same process with respect to each data object in the data object assignment container (e.g., to create multiple shipping labels rather than selecting a "Print" option multiple times).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing data concurrency in a multiuser system with respect to assignment of data objects, the method comprising:
    storing, by one or more processors of the multiuser system, the data objects in a database accessible to the multiuser system, wherein one or more of the data objects include information corresponding to mail items to be shipped;
    configuring, by the one or more processors of the multiuser system, a data object assignment container, wherein the data object assignment container is configured to store instances of the one or more of the data objects;
    receiving, by the one or more processors of the multiuser system, a designation of an assignee for the data object assignment container, wherein the assignee comprises a user of the multiuser system, and wherein the designation of the assignee provides information regarding the assignee;
    receiving, by the one or more processors of the multiuser system, information identifying at least one data object of the data objects for assignment with respect to the assignee;
    storing, by the one or more processors of the multiuser system, an instance of the at least one data object, which is not conflictingly associated with another active data object assignment container within the multiuser system, in the data object assignment container, wherein the instance of the at least one data object stored in the data object assignment container provides an assignment of the at least one data object to the assignee, wherein the assignment with respect to the at least one data object to the assignee provides for processing of the at least one data object by the assignee without duplication of assignment of one or more tasks to a second assignee, wherein the data object assignment container includes identification data uniquely identifying the data object assignment container to distinguish the data object assignment container from other data object assignment containers of the multiuser system, and wherein the data object assignment container further includes order sequence data indicative of an order in which data objects associated with the data object assignment container are to be processed;

transmitting, by the one or more processors of the multiuser system, information regarding the data objects associated with the data object assignment container to one or more user systems for display at one or more graphical user interfaces;

receiving, by the one or more processors of the multiuser system, update information regarding changes to the at least one data object of the data objects associated with the data object assignment container from the one or more user systems, wherein the update information prevents the processing of the at least one data object by the assignee; and updating, by the one or more processors of the multiuser system, the at least one data object of the data objects associated with the data object assignment container at the database accessible to the multiuser system.

2. The method of claim 1, wherein the transmitting, by the one or more processors of the multiuser system, the information regarding the data objects associated with the data object assignment container to the one or more user systems for display at the one or more graphical user interfaces further comprises:

initiating, by the one or more processors of the multiuser system, a plurality of communication channels among a first subset of the one or more user systems, wherein the first subset of the one or more user systems is associated with affiliated users of the multiuser system;

bundling, by the one or more processors of the multiuser system, a subset of the plurality of the communication channels to facilitate interaction among the first subset of the one or more user systems; and providing, by the one or more processors of the multiuser system, the update information to the first subset of the one or more user systems.

3. The method of claim 2, wherein one or more of the plurality of communication channels comprise socket pairs configured to facilitate secure inter-process communications.

4. The method of claim 1, wherein the updating, by the one or more processors of the multiuser system, the at least one data object of the data objects associated with the data object assignment container at the database accessible to the multiuser system comprises:

updating, by the one or more processors of the multiuser system, a flag corresponding to a data record associated with the least one data object, wherein the updating the flag indicates that the data object assignment container corresponding to the at least one data object is accessible to a user device of the multiuser system.

5. The method of claim 1, the method further comprising:

identifying, by the one or more processors of the multiuser system, one or more exception data objects corresponding to the one or more of the data objects incorrectly assigned to one or more of the other data object assignment containers.

6. The method of claim 5, wherein the identifying, by the one or more processors of the multiuser system, the one or more exception data objects comprises:

determining, by the one or more processors of the multiuser system, that a first instance of a data object of the one or more of the data objects was assigned to a first data object assignment container at a first time instance and that a second instance of the data object was assigned to a second data object assignment container, distinct from the first data object container, at a second time instance subsequent to the first time instance.

7. The method of claim 5, the method further comprising:

reassigning, by the one or more processors of the multiuser system, the one or more exception data objects, wherein the one or more exception data objects include a data field storing a data value indicating to the one or more processors that the one or more exception data objects are to be reassigned.

8. The method of claim 1, the method further comprising:

detecting, by the one or more processors of the multiuser system, an attempted use, by a user device of the multiuser system, of a data object inconsistent with assignment of the data object to the data object assignment container.

9. The method of claim 8, the method further comprising:

preventing, by the one or more processors of the multiuser system, the user device associated with the user of the multiuser system from manipulating the data object in a manner inconsistent with the assignment of the data object to the data object assignment container.

10. The method of claim 1, wherein at least one of the one or more graphical user interfaces is configured to display an order assignment window depicting tasks assigned to a second user of a second user device of the one or more user systems.

11. A system for providing data concurrency, the system comprising:

a memory configured to store:
    a database comprising one or more data objects for use by one or more users of the system, wherein at least one data object of the one or more data objects includes information corresponding to a mail item to be shipped; and
    one or more data object assignment container instances; and data object assignment management logic executable by one or more processors to:
    instantiate at least one data object assignment container instance of the one or more data object assignment container instances;
    receive a designation of an assignee for the at least one data object assignment container instance, wherein the assignee comprises a user of the system, and wherein the designation of the assignee provides information regarding the assignee;
    receive information for the at least one data object for assignment with respect to the assignee corresponding to the at least one data object assignment container instance; and
    store an instance of the at least one data object, which is not conflictingly associated with another active data object assignment container instance within the system, in the at least one data object assignment container instance, wherein the instance of the at least one data object stored in the at least one data object assignment container instance provides an assignment of the at least one data object to the assignee, wherein the assignment of the at least one data object to the assignee provides for processing of the at least one data object by the assignee without duplication of assignments of one or more tasks to a second assignee, wherein the at least one data object assignment container instance includes identification data uniquely identifying the at least one data object assignment container instance to distinguish the at least one data object assignment container instance from other data object assignment container instances instantiated by the system, and wherein the at least one data object assignment container instance further includes order sequence data indicative of an order in which the at least one data object associated with the data object assignment container instance are to be processed.

12. The system of claim 11, the system further comprising:
  authentication logic operable to identify channel groups corresponding to communication channels among devices of the system associated with affiliated users; and
  channel management logic operable to arbitrate communication among channels of a channel group of the channel groups to facilitate virtual communication links among user devices of the channel group to provide data concurrency among the user devices.

13. The system of claim 11, wherein the data object assignment management logic is further operable to broadcast the designation of the assignee for the at least one data object assignment container instance to a plurality of user devices of the system.

14. The system of claim 11, wherein the at least one data object assignment container instance is configured to store first information corresponding to tasks to be performed with respect to one or more data objects assigned to the at least one data object assignment container instance, second information corresponding to a current state of performance of the tasks, and third information corresponding to an expiration time of the at least one data object assignment container instance.

15. The system of claim 11, wherein the data object assignment management logic is further operable to prevent an attempt by a user of the system to store an instance of at least a second data object in the at least one data object assignment container instance, wherein the at least the second data object conflicts with the at least one data object.

16. The system of claim 11, wherein the data object assignment management logic is further operable to:
  determine whether at least a second data object for putative assignment with respect to an assignee conflict with the at least one data object.

17. A non-transitory computer-readable medium of a multiuser system for providing data concurrency, the non-transitory computer-readable medium having instructions that, when executed by one or more processors of the multiuser system cause the one or more processors to:
  store data objects in a database accessible to the multiuser system, wherein one or more data objects of the data objects include information corresponding to mail items to be shipped;
  configure a data object assignment container, wherein the data object assignment container is configured to store instances of the one or more data objects;
  receive a designation of an assignee for the data object assignment container, wherein the assignee comprises a user of the multiuser system, and wherein the designation of the assignee provides information regarding the assignee;
  receive information identifying at least one data object of the data objects for putative assignment with respect to the assignee;
  store an instance of the at least one data object, which is not conflictingly associated with another active data object assignment container within the multiuser system, in the data object assignment container, wherein the instance of the at least one data object stored in the data object assignment container provides an assignment of the at least one data object to the assignee, wherein the assignment with respect to the at least one data object to the assignee provides for processing of the at least one data object by the assignee without duplication of assignment of one or more tasks to a second assignee, wherein the data object assignment container includes identification data uniquely identifying the data object assignment container to distinguish the data object assignment container from other data object assignment containers of the multiuser system, and wherein the data object assignment container further includes order sequence data indicative of an order in which data objects associated with the data object assignment container are to be processed;
  transmit information regarding the data objects associated with the data object assignment container to one or more user systems for display at one or more graphical user interfaces;
  receive update information regarding changes to the at least one data object of the data objects associated with the data object assignment container from the one or more user systems, wherein the update information prevents the processing of the at least one data object by the assignee; and
  update the at least one data object of the data objects associated with the data object assignment container at the database accessible to the multiuser system.

18. The non-transitory computer-readable medium of claim 17, wherein the instructions, when executed by the one or more processors of the multiuser system, further cause the one or more processors to:
  assign the one or more of the data objects to one or more inactive data object assignment containers.

19. The non-transitory computer-readable medium of claim 17, wherein the instructions, when executed by the one or more processors of the multiuser system, further cause the one or more processors to:
  propagate a change in a state of the instance of the at least one data object assigned to the data object assignment container to devices of the multiuser system.

20. The non-transitory computer-readable medium of claim 19, wherein the devices of the multiuser system comprise a plurality of devices associated with a plurality of users of the multiuser system.

* * * * *